(12) United States Patent
Sasaki et al.

(10) Patent No.: US 10,761,000 B2
(45) Date of Patent: Sep. 1, 2020

(54) LIQUID STIRRING METHOD

(71) Applicant: Hitachi High-Technologies Corporation, Tokyo (JP)

(72) Inventors: Shunsuke Sasaki, Tokyo (JP); Yoshihiro Yamashita, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 0 days.

(21) Appl. No.: 15/320,769

(22) PCT Filed: Jun. 15, 2015

(86) PCT No.: PCT/JP2015/067111
§ 371 (c)(1),
(2) Date: Dec. 21, 2016

(87) PCT Pub. No.: WO2016/009764
PCT Pub. Date: Jan. 21, 2016

(65) Prior Publication Data
US 2017/0205321 A1    Jul. 20, 2017

(30) Foreign Application Priority Data

Jul. 18, 2014   (JP) .................................. 2014-147292

(51) Int. Cl.
*G01N 1/38* (2006.01)
*G01N 35/02* (2006.01)
(Continued)

(52) U.S. Cl.
CPC ................ *G01N 1/38* (2013.01); *B01F 3/08* (2013.01); *B01F 3/0861* (2013.01);
(Continued)

(58) Field of Classification Search
CPC ...... G01N 1/38; G01N 35/1009; B01F 13/00; B01F 11/0074; B01F 2215/0037; B01F 3/0861
See application file for complete search history.

(56) References Cited

U.S. PATENT DOCUMENTS 4,818,492 A    4/1989 Shimizu
6,576,477 B1   6/2003 Tokiwa et al.
(Continued)

FOREIGN PATENT DOCUMENTS

JP    58-196461 A    11/1983
JP    04-005568 A     1/1992
(Continued)

OTHER PUBLICATIONS

International Search Report of PCT/JP2015/067111 dated Sep. 8, 2015.

*Primary Examiner* — Lyle Alexander
*Assistant Examiner* — Bryan Kilpatrick
(74) *Attorney, Agent, or Firm* — Mattingly & Malur, PC

(57) ABSTRACT

In a liquid stirring method, after a second liquid is discharged into a reaction container accommodating a first liquid from a dispensing probe provided with a dispensing tip at the leading end thereof, a mixture of the first liquid and second liquid in the container is stirred by being sucked out and discharged by the dispensing probe. The number of stirrings through sucking out and discharging is changed according to the total volume of the first liquid and second liquid. If the total volume of the first liquid and second liquid is below a preset threshold, sucking out and discharging is repeated for a prescribed number of times.

6 Claims, 6 Drawing Sheets

(51) Int. Cl.
*G01N 35/10* (2006.01)
*B01F 3/08* (2006.01)
*B01F 11/00* (2006.01)
*B01F 13/00* (2006.01)
*B01F 15/02* (2006.01)

(52) U.S. Cl.
CPC .......... *B01F 11/0074* (2013.01); *B01F 13/00* (2013.01); *B01F 15/02* (2013.01); *G01N 35/02* (2013.01); *G01N 35/1009* (2013.01); *B01F 2215/0037* (2013.01)

(56) References Cited

U.S. PATENT DOCUMENTS

| | | | |
|---|---|---|---|
| 7,027,935 B2 | 4/2006 | Shimase et al. | |
| 8,802,032 B2 | 8/2014 | Yamashita et al. | |
| 9,389,240 B2 | 7/2016 | Takahashi et al. | |
| 9,835,612 B2 | 12/2017 | Makino et al. | |
| 9,927,453 B2 | 3/2018 | Hirano et al. | |
| 2004/0181050 A1* | 9/2004 | Shoji | B01L 3/0275 536/25.4 |
| 2004/0245275 A1* | 12/2004 | Yanami | G01N 35/0092 221/197 |
| 2010/0262389 A1 | 10/2010 | Nakanishi et al. | |
| 2013/0259745 A1 | 10/2013 | Yamazaki et al. | |
| 2014/0064019 A1 | 3/2014 | Hamada et al. | |

FOREIGN PATENT DOCUMENTS

| | | |
|---|---|---|
| JP | 06-265554 A | 9/1994 |
| JP | 11-142414 A | 5/1999 |
| JP | 11-304817 A | 11/1999 |
| JP | 2000-206123 A | 7/2000 |
| JP | 2008-241508 A | 10/2008 |
| JP | 2010-071904 A | 4/2010 |
| JP | 2011-107089 A | 6/2011 |
| JP | 2014-048113 A | 3/2014 |

* cited by examiner

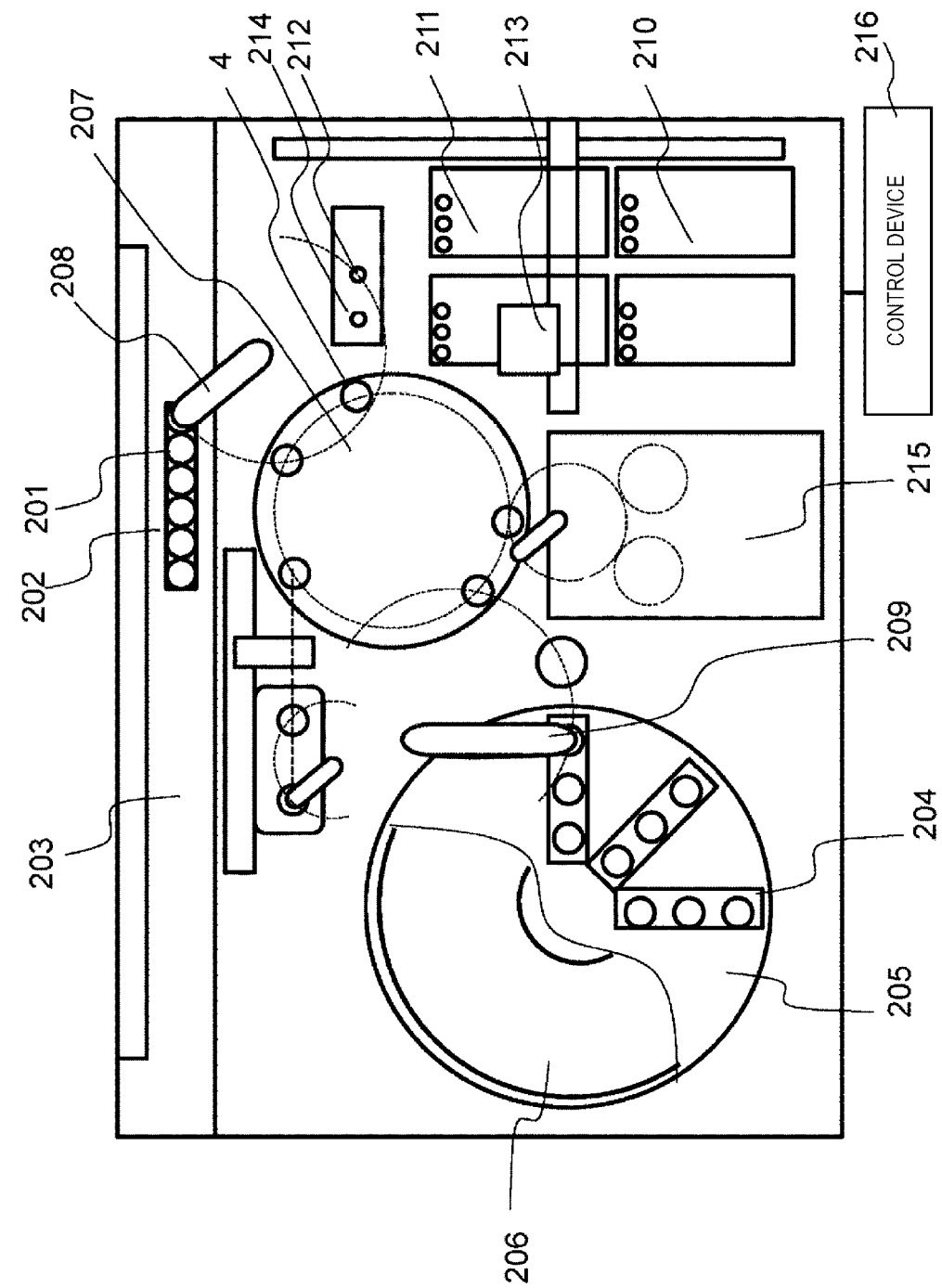
[Fig. 1]

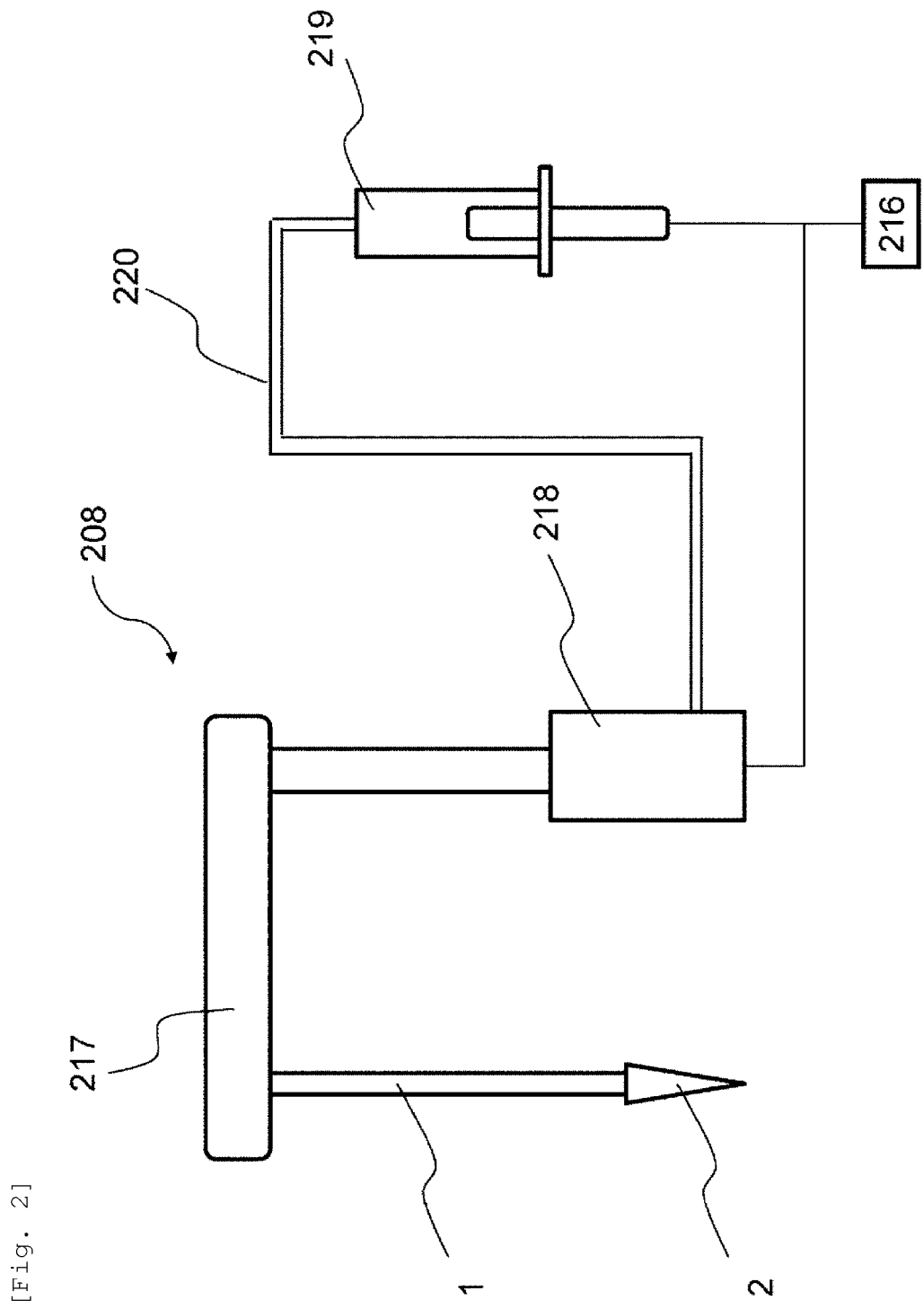
[Fig. 2]

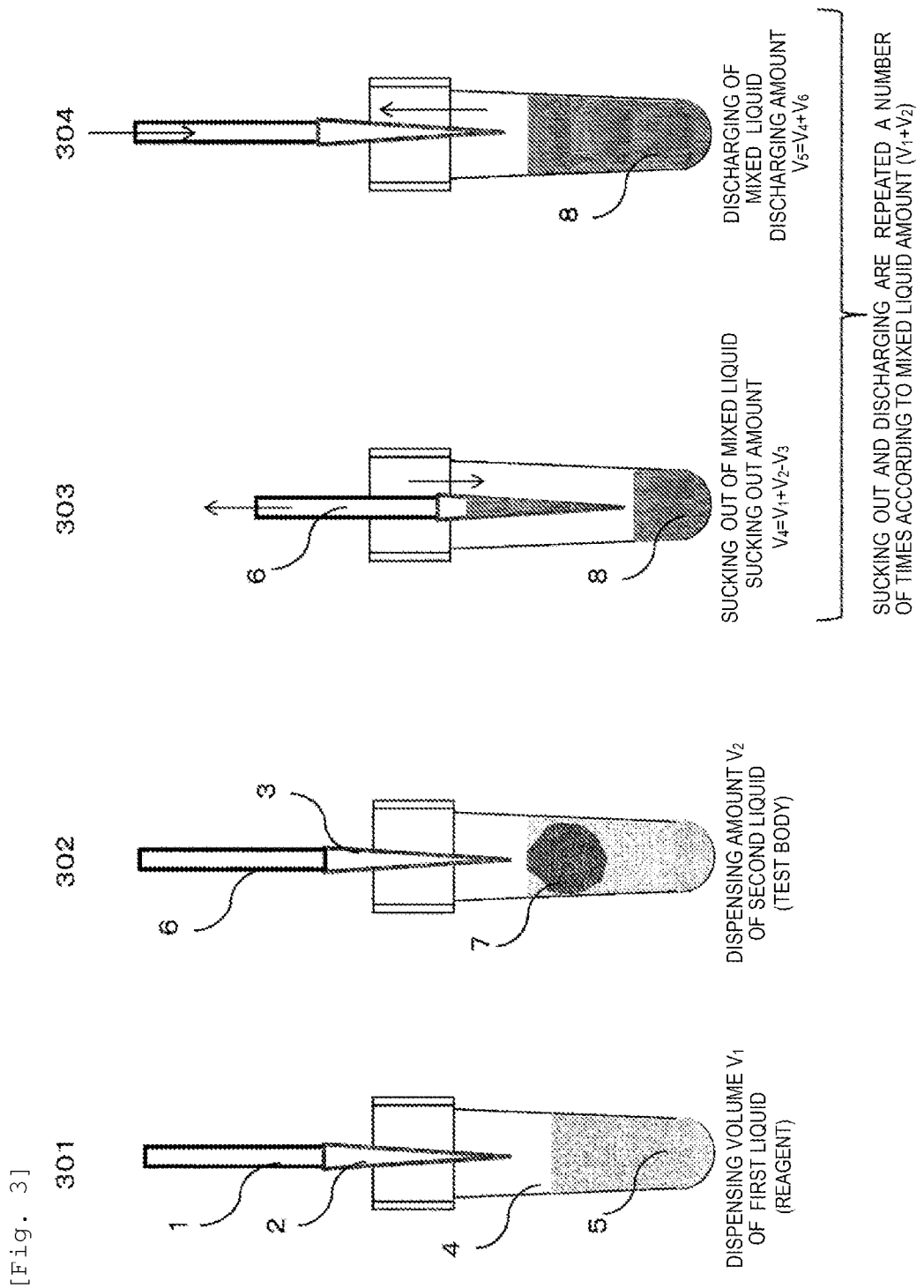

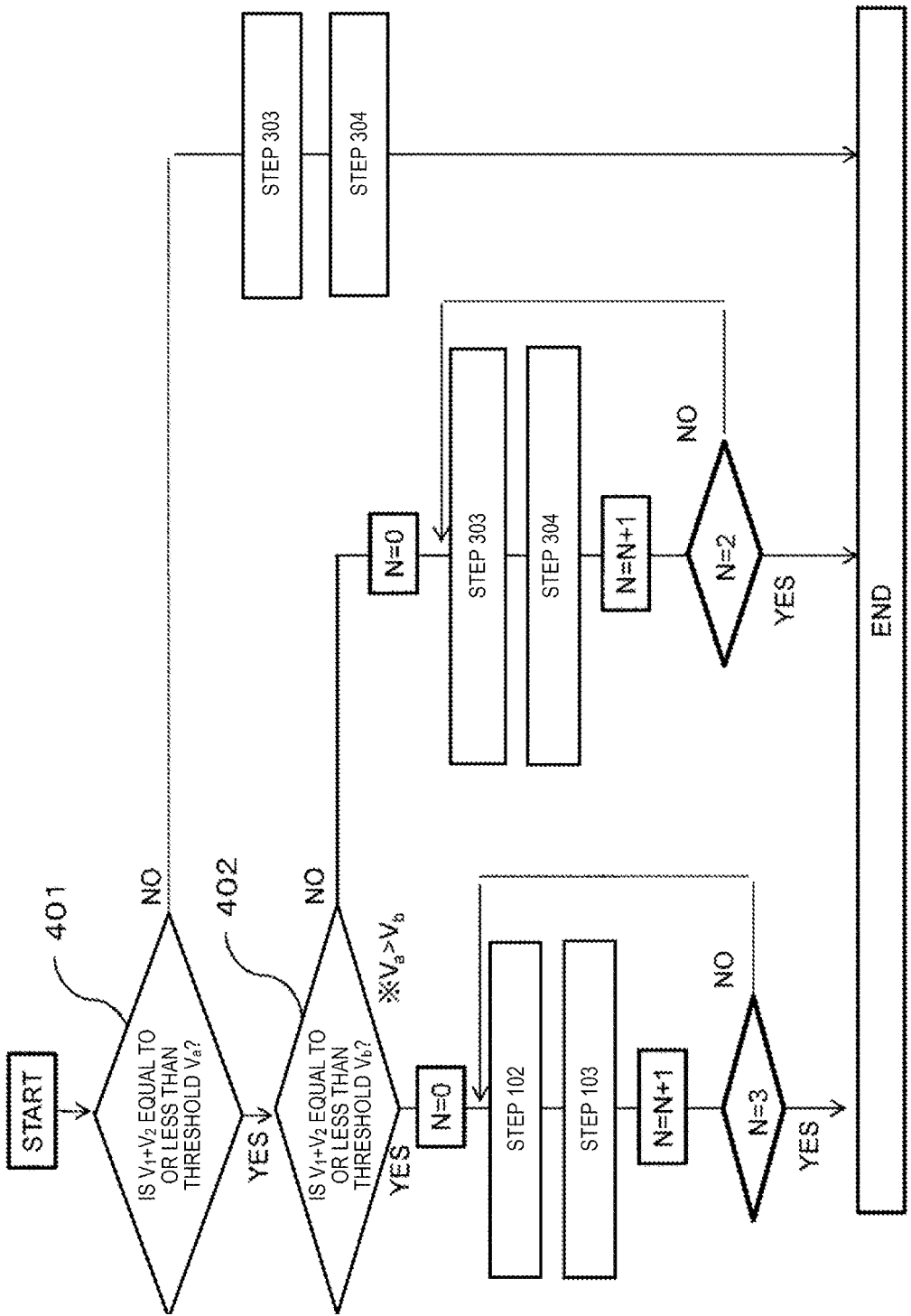

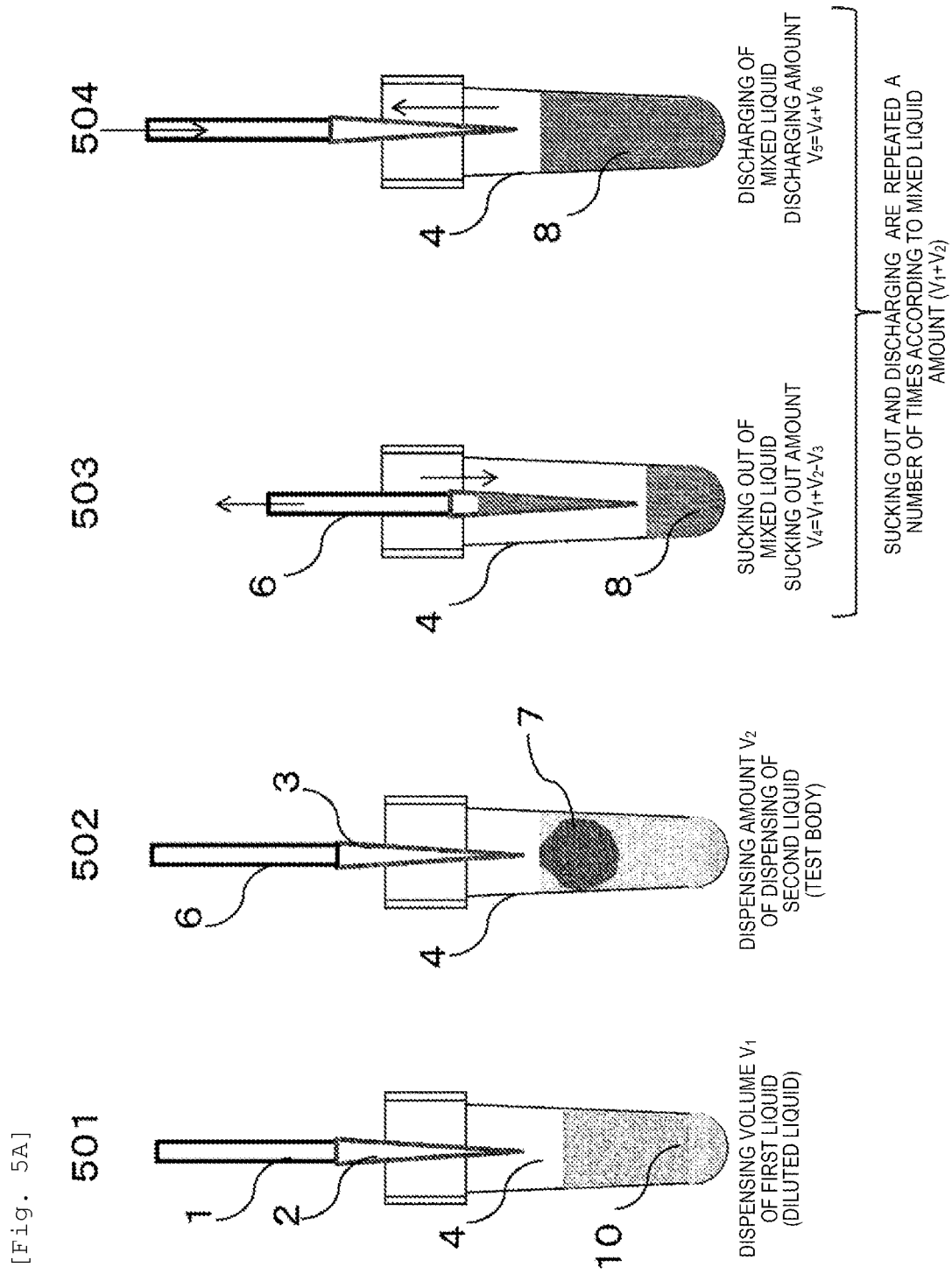

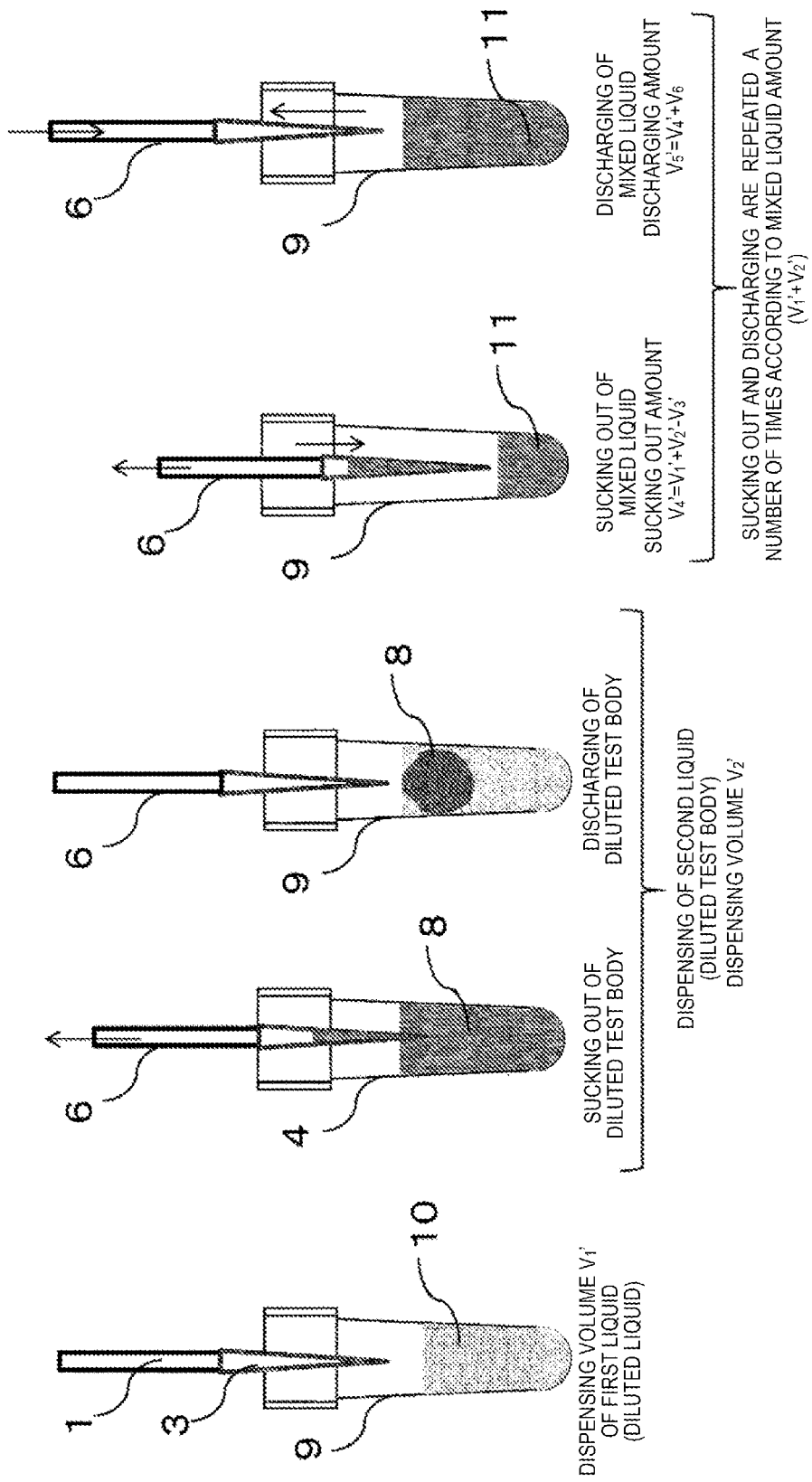

LIQUID STIRRING METHOD

TECHNICAL FIELD

The present invention relates to a method and an apparatus for stirring a plurality of liquids such as blood.

BACKGROUND ART

In a dispensing device or an automatic analyzing device of the related art, in a case where a plurality of liquids such as a test body, a reagent, and a diluted liquid of several μL to hundreds μL are dispensed in one container, liquids are precipitated or separated by a magnitude of a specific gravity. Therefore, it is necessary to stir a mixed liquid within the container after dispensing, and as a general method, a method, in which the mixed liquid dispensed within the container is sucked out and discharged by a dispensing probe, and stirring is performed by convection within the container, is known. For example, in Patent Literature 1, a dispensing apparatus is described in which in order to stir a sample or a reagent after the sample or the reagent that is sucked out within a dispensing tip mounted on a dispensing probe is discharged to a container, the sample or the reagent that is discharged to the container is sucked out and discharged within the dispensing tip. Stirring may be performed one by one by sucking out and discharging, but may be repeatedly performed for a prescribed number of times.

CITATION LIST

Patent Literature

PTL 1: JP-A-2000-206123

SUMMARY OF INVENTION

Technical Problem

In recent years, from a viewpoint of a usage reduction of the test body or the reagent, a dispensing amount of the test body or the reagent tends to be a very small amount and a liquid amount of the mixed liquid tends to be a small amount. Along with the very small amount of the mixed liquid, it is necessary to sufficiently stir a liquid amount of equal to or less than 100 μL that is less handled in automatic analysis of the related art. In contrast, in a stirring method of a mixed liquid by sucking out and discharging of liquids in the related art, along with the reduction in the amount of the mixed liquid, an amount of a liquid to be sucked out and discharged during stirring is also reduced. Therefore, the convection of the liquid for producing sufficient stirring within the mixed liquid does not occur and the stirring may be uneven.

Therefore, the invention provides a liquid stirring method that makes it possible to stir evenly without reducing dispensing and analysis throughput and while avoiding a risk of splashing or bubbling even if an amount of a mixed liquid within a container is low.

Solution to Problem

In order to solve the problem described above, the invention provides a liquid stirring method in which a plurality of liquids accommodated within a container are sucked out and discharged by a dispensing probe, stirring is performed, and the number of stirrings by sucking out and discharging is changed according to a total volume of the plurality of liquids. In addition, in the liquid stirring method, in a case where the total volume of the plurality of liquids is smaller than a prescribed threshold, stirring by sucking out and discharging is repeated for a prescribed number of times.

Advantageous Effects of Invention

According to the invention, it is possible to efficiently perform the stirring for a short period of time without reducing dispensing and analysis throughput even if an amount of the mixed liquid to be stirred is small.

BRIEF DESCRIPTION OF DRAWINGS

FIG. 1 is a schematic view of an analyzing apparatus including a dispensing mechanism for executing a liquid stirring method.

FIG. 2 is a schematic view of the dispensing mechanism for executing the liquid stirring method.

FIG. 3 is an example of an operation flow of the dispensing mechanism for executing the liquid stirring method.

FIG. 4 is an example of a flowchart of a stirring operation including a stirring number determination process.

FIG. 5A is a view illustrating a diluting operation flow of a test body.

FIG. 5B is a view illustrating the diluting operation flow of the test body.

DESCRIPTION OF EMBODIMENTS

Hereinafter, an example of the invention will be described with reference to the drawings.

Example 1

FIG. 1 is a schematic view illustrating an automatic analyzing apparatus to which a liquid stirring method of the invention is applied.

In FIG. 1, an automatic analyzing apparatus 200 mainly includes a rack 202 in which a plurality of sample containers 201 for accommodating biological samples (hereinafter, referred to as a test body) such as blood and urine are stored; a rack transporting line 203 that transports the rack 202; a reagent container disk 205 that is a reagent container storage portion, in which a plurality of reagent containers 204 for accommodating various kinds of reagents that are used in analysis of the test body are stored and are kept warm, and which is covered by an reagent disk cover 206; an incubator disk 207 in which a plurality of reaction containers 4 for reacting the test body and the reagent are stored; a sample dispensing mechanism 208 that dispenses the test body to the reaction containers 4 of the incubator disk 207 from the sample container 201 by a rotation drive and a vertical drive; a reagent dispensing mechanism 209 that dispenses the reagent to the reaction containers 4 of the incubator disk 9 from the reagent container 204 by a rotation drive and a vertical drive; a detection portion unit 215 that performs analysis of a reaction liquid; and a control device 216 that controls an entire operation of the automatic analyzing apparatus 200.

In addition, the automatic analyzing apparatus 200 includes a reaction container and dispensing tip storing portion 211 in which the plurality of reaction containers 4 or dispensing tips 2 and 3 that are unused are stored; a reaction container and dispensing tip storing portion 210 in which the plurality of reaction containers 4 or dispensing tips 2 and 3 are in standby for replacement or replenishment; a disposal hole 212 for disposing of the dispensing tips 22a and reaction containers 8 that are used; and a transporting mechanism 213 that grips and transports the dispensing tips 2 and 3, and the reaction containers 206. The transporting mechanism 213 is movably provided in an X-axis, a Y-axis, and a Z-axis direction (not illustrated), transports the reaction container 4 stored in the reaction container and dispensing tip storing portion 211 to the incubator disk 207, disposes of the used reaction container 4 to the disposal hole 212, or transports the used dispensing tips 2 and 3 to a tip mounting position 214.

FIG. 2 is a schematic view of the sample dispensing mechanism 209 that is mounted on the automatic analyzing apparatus in the example. The sample dispensing mechanism 209 includes an arm 217 that is driven in a horizontal direction and a vertical direction; a dispensing probe 1 that is provided at one end of the arm 217, immerses in a test body 201a of the sample container 201 to suck out the test body; the disposable dispensing tip 2 that is a leading end (lower end) of the dispensing probe 1 and is attached to a immersed portion of the test body 209a; a drive portion 218 such as a motor that is connected to the other end of the arm 217 and horizontally drives and vertically drives the arm 217; and a syringe 219 that is connected to the dispensing probe 1 and sucks out and discharges the test body using water that is a pressure transmitting medium within a pipe 220 as a medium for transmitting an operation.

Next, a detailed example of the liquid stirring method that is employed in the automatic analyzing apparatus described above will be described. FIG. 3 is an operation flow of the stirring process for stirring a liquid by sucking out and discharging the mixed liquid by the stirring process.

Initially, in a state where the reagent dispensing probe 1 where the dispensing tip 2 is attached to the leading end is immerged in a first liquid (reagent), the syringe 219 is driven and a prescribed amount of the first liquid is sucked out within the dispensing tip 2. Thereafter, the dispensing probe 1 is lowered within the reaction container 4 and the first liquid of a volume V1 is discharged (step 301).

After completing step 301, the reagent dispensing probe 1 is lifted and is moved from the inside of the container. The dispensing tip 3 is mounted on a test body dispensing probe 6, in this state, the test body dispensing probe 6 is immerged in a second liquid (test body), the syringe 219 is driven, and then a prescribed amount of the second liquid is sucked out within the dispensing tip 3. Thereafter, the dispensing probe 1 is lowered to the reaction container 4 in which the first liquid is accommodated and the second liquid of a volume V2 is discharged (step 302).

After discharging the second liquid, a mixed liquid of the first liquid and the second liquid accommodated in the reaction container 4 is sucked out by a volume V4 while further lowering the dispensing probe 1 without lifting the dispensing probe 1 (step 303). Moreover, if an entire volume of the mixed liquid is sucked out, a vacant sucked state occurs and there is a concern that splashing or bubbling of the liquid is generated within the dispensing tip 3, or the leading end of the dispensing probe comes into contact with a bottom surface of the container. Therefore, after the sucking-out is performed in step 303, a sucking out amount of the mixed liquid is adjusted such that a constant volume (volume V3) of the mixed liquid remains within the container 3. That is, the sucking out amount V4 is defined by a formula of V1+V2−V3. If the sucking-out is completed, lowering of the dispensing probe 1 is stopped. Moreover, in step 303, a lowered amount of the dispensing probe 1 is determined by a volume (V1+V2) of the mixed liquid. That is, in a case where the volume V1+V2 of the mixed liquid is large, the sucking out amount V4 is large and, in a case where the volume of the mixed liquid is small, the sucking out amount V4 is also small. Therefore, it is possible to determine the lowered amount of the dispensing probe 1 based on the sucking out amount V4 that is determined from the volume of the mixed liquid and a shape (cross sectional area) of the reaction container 4. Here, in order to increase efficiency of sucking out, discharging, and stirring, it is preferable that V4 is large as much as possible and V3 is very small amount. For example, V3 is approximately 20 μL (liquid surface from the bottom of the container is approximately 2 mm).

In order to prevent a residual mixed liquid within the dispensing tip 3, the syringe is driven and the mixed liquid within the dispensing tip 3 is discharged within the reaction container 4 such that a volume V5 (V5=V4+V6) that is obtained by adding a volume V6 to the volume V4 of the mixed liquid that is sucked out is capable of discharging while lifting the dispensing probe 1 from a position in which the dispensing probe 1 is stopped in step 303 (step 304).

In the stirring process in the example, the stirring is performed by convection of the mixed liquid occurring within the dispensing tip 3 when sucking out the volume V4 and convection of the mixed liquid occurring within the container 3 during discharging the volume V5. Therefore, in a case where the total volume V1+V2 of the mixed liquid is large (equal to or greater than 80 μL), since sufficient convection occurs within the dispensing tip and the container 3 by one sucking out and discharging, the stirring can be evenly performed. Therefore, in the example, in a case where a prescribed threshold is used and the volume V1+V2 of the mixed liquid is greater than the prescribed threshold, sucking out, discharging, and stirring are completed at a time when a first step 104 is completed.

On the other hand, in a case where the liquid amount of the mixed liquid within the container is very small, that is, equal to or less than 80 μL and the like, a volume of the mixed liquid that is moved during sucking out and discharging is small and sufficient convection does not occur within the dispensing tip and the container. Therefore, the stirring cannot be performed in the sucking out and discharging once. Therefore, in a case where the volume V1+V2 of the mixed liquid is lower than the prescribed threshold, steps 303 and 304 are repeated a number of times, and the stirring process is completed. Moreover, if the volumes V4 and V5 of the mixed liquid that are moved when performing the sucking out and discharging once, since a time necessary for the sucking out, discharging, and stirring once is short, it is possible to execute a number of the sucking out, discharging, and stirring in same time when performing the sucking out, discharging, and stirring once that are executed in a case where the total volume V1+V2 of the mixed liquid is large. Therefore, it is possible to evenly stir the mixed liquid by executing a number of stirrings without lowering dispensing and analysis throughput.

Moreover, the invention is not limited to the example described above and includes various modifications. For example, in the example described above, two kinds of liquids are dispensed to the container by steps 301 and 302, but steps 301 and 302 are repeated and stirring of the mixed liquid of two kinds or more may be executed. In addition, the threshold or the number of repetitions of steps 303 and 304 is also not limited to the example and may be arbitrary set. Furthermore, in the example, the sample dispensing mechanism including the disposable tip is used, but the invention can be applied to a reagent dispensing mechanism, a fixed type tip, and the like.

According to the example, noting that in a case where the liquid amount is small, the sucking out, discharging, and stirring are not evenly executed, in a case where the liquid amount of the mixed liquid is sufficient, the sucking out, discharging, and stirring are executed once, and only in a case where the liquid amount of the mixed liquid is small, the sucking out, discharging, and stirring are performed a number of times. Therefore, it is possible to obtain a sufficient stirring effect without prolonging a time required to perform unnecessary sucking out, discharging, and stirring processes.

Example 2

Next, a second example of the invention will be described.

FIG. 4 is an example of a flowchart of the stirring operation including a stirring number determination process. Initially, a control device 216 calculates a total volume V1+V2 of a volume V1 of a first liquid and a volume V2 of a second liquid. Next, a prescribed threshold Va and a total volume V1+V2 are compared (step 401), if V1+V2 is greater than Va, steps 303 and 304 are executed once and the stirring is completed.

On the other hand, if V1+V2 is smaller than Va, a threshold Vb (<Va) and the total volume V1+V2 are compared (step 402). If V1+V2 is greater than Vb, steps 303 and 304 are repeatedly executed twice and the stirring is completed. If V1+V2 is smaller than Vb, steps 303 and 304 are repeatedly executed three times and the stirring is completed.

According to the example, it is possible to finely set the number of the sucking out, discharging, and stirring depending on the volume. Therefore, the liquid can be further reliably sucked out, discharged, and stirred.

Example 3

In the example, a stirring method in a diluting operation of a test body will be described with reference to FIGS. 5A and 5B. FIGS. 5A and 5B are views illustrating a diluting operation flow of the test body.

In a case where the test body is diluted using the liquid stirring method of the related art, the test body and the diluted liquid do not evenly mixed and non-uniformity of a dilution ratio may occur in a diluted test body within one container. Particularly, in a case where a diluting process is repeated a number of times and the diluted test body having a high dilution ratio is created, if the mixed liquid does not become a desired dilution ratio in the diluting process in a first time, a significant deviation may occur between a dilution ratio of a final diluted test body that is obtained by repeating a number of diluting processes and a desired dilution ratio. In the example, a sucking out, discharging, and stirring method of the diluted liquid and the test body, in which the dilution ratio test body can be accurately created, will be described.

Initially, a first liquid (diluted liquid) of a volume V1 is dispensed to a reaction container 4 by using a reagent dispensing probe 1 including a dispensing tip 2 at a leading end (step 501).

Next, a second liquid (test body) of a volume V2 is dispensed to the reaction container 4 to which a diluted liquid is dispensed by using a test body dispensing probe 6 including another dispensing tip 3 at a leading end (step 502).

The test body dispensing probe 6 sucks out a volume V4 of a mixed liquid of a reagent and a test body accommodated in the reaction container 4 while being lowered (step 503). In this case, a lowered amount of the dispensing probe 1 is determined by V1+V2 and in order to prevent splashing or bubbling of the liquid within the dispensing tip 3 due to a vacant state, a total volume V1+V2 is not completely sucked out and a prescribed amount (volume V3) is left within the container.

In order to prevent a residual mixed liquid within the dispensing tip 3, a syringe 219 is driven such that a volume V5 that is obtained by adding a volume V6 to a volume V4 that is sucked out in step 503 is discharged. In addition, in order to prevent attachment of the mixed liquid to an outer wall of the dispensing tip 3, the dispensing probe 1 discharges the mixed liquid to the reaction container 4 while being lifted from a position in which the dispensing probe 1 is stopped in step 503 (step 504). In a case where a total volume V1+V2 of the reagent and the test body is less than a prescribed threshold, steps 503 and 504 are repeated a number of times and the stirring operation is completed.

Furthermore, in a case where dilution having a high ratio is performed, the diluting operation is continued. The diluted liquid is dispensed within a reaction container 9 different from the reaction container 4 that is just used by a volume V1' (step 505).

Next, the diluted test body accommodated within the reaction container 4 is sucked out by a volume V2' and is discharged to the reaction container 9 (step 506). In order to sufficiently stir the diluted liquid and the diluted test body, the sucking out, discharging, and stirring are performed and the mixed liquid of a volume V4' is sucked out within the tip (step 507), and is discharged within the reaction container 5 by a volume V5' (step 508). Moreover, a calculating method of V1' to V5' and a determining method of the number of stirrings are the same as those in steps 503 and 504. Furthermore, in a case where the diluting operation is continued, step 505 to step 508 are repeated.

According to the example, it is possible to accurately dilute the test body to a desired ratio by executing the sucking out, discharging, and stirring in the example in the diluting operation of the test body.

REFERENCE SIGNS LIST

1 reagent dispensing probe
2, 3 dispensing tip
4, 9 reaction container
5 reagent
6 test body dispensing probe
7 test body
8 mixed liquid
10 diluted liquid
11 diluted test body
101 dispensing step of first liquid
102 dispensing step of second liquid
103 sucking out step of mixed liquid
104 discharging step of mixed liquid
200 automatic analyzing apparatus
201 sample container
202 rack
203 rack transporting line
204 reagent container
205 reagent container disk 206 reagent disk cover
207 incubator disk
208 sample dispensing mechanism
209 reagent dispensing mechanism
210, 211 reaction container and dispensing tip storing portion
212 disposal hole
213 transporting mechanism
214 tip mounting position
215 detection portion unit
216 control device
217 arm
218 vertical rotation drive portion
219 syringe
220 pipe

The invention claimed is:

1. A stirring method to stir a mixed liquid comprised of a first liquid and a second liquid in a first container by driving a syringe, the method comprising:
determining, by a control device, whether a total liquid volume of the mixed liquid is greater than a prescribed threshold;
in a case where the total liquid volume of the mixed liquid is greater than the prescribed threshold, performing a first stirring process only once by the control device controlling driving of the syringe, the first stirring process including sucking out the mixed liquid from the first container by controlling driving of the syringe to a first syringe drive amount and discharging the mixed liquid from the syringe into the mixed liquid remaining in the first container by controlling driving of the syringe to a second syringe drive amount, that is greater than the first syringe drive amount; and
in a case where the total liquid volume of the mixed liquid is equal to or less than the prescribed threshold, repeatedly performing a second stirring process for a predetermined number of times by the control device controlling driving of the syringe, the second stirring process including sucking out the mixed liquid from the first container by controlling driving of the syringe to a third syringe drive amount and discharging the mixed liquid from the syringe into the mixed liquid remaining in the first container by controlling driving of the syringe to a fourth syringe drive amount, that is greater than the third syringe drive amount and smaller than the first syringe drive amount,
wherein, in the first stirring process, the mixed liquid sucked out from the first container is smaller than the total liquid amount of the mixed liquid, and
wherein, in the second stirring process, the mixed liquid sucked out from the first container is smaller than the total liquid amount of the mixed liquid.

2. The stirring method according to claim 1, wherein the threshold is 80 μL.

3. The stirring method according to claim 1, wherein the first liquid is a diluted liquid or a reagent and the second liquid is a test body.

4. The stirring method according to claim 1, wherein the second stirring process is performed in a time for performing the first stirring process.

5. An automatic analyzing apparatus comprising:
a container configured to hold a mixed liquid comprised of a first liquid and a second liquid;
a probe and a syringe which are connected by a pipe and are configured to suck and discharge the mixed liquid within the container by driving the syringe; and
a control device programmed to:
determine whether a total liquid volume of the mixed liquid is greater than a prescribed threshold;
in a case where the total liquid volume of the mixed liquid is greater than the prescribed threshold, control the probe and syringe to perform a first stirring process only once by controlling driving of the syringe, the first stirring process including sucking out the mixed liquid from the first container by controlling driving of the syringe to a first syringe drive amount and discharging the mixed liquid from the syringe into the mixed liquid remaining in the first container by controlling driving of the syringe to a second syringe drive amount, that is greater than the first syringe drive amount; and
in a case where the total liquid volume of the mixed liquid is equal to or less than the prescribed threshold, control the probe and syringe to repeatedly perform a second stirring process for a predetermined number of times by controlling driving of the syringe, the second stirring process including sucking out the mixed liquid from the first container by controlling driving of the syringe to a third syringe drive amount and discharging the mixed liquid from the syringe into the mixed liquid remaining in the first container by controlling driving of the to a fourth syringe drive amount, that is greater than the third syringe drive amount and smaller than the first syringe drive amount,
wherein, in the first stirring process, the mixed liquid sucked out from the first container is smaller than the total liquid volume of the mixed liquid, and
wherein, in the second stirring process, the mixed liquid sucked out from the first container is smaller than the total liquid volume of the mixed liquid.

6. The automatic analyzing apparatus according to claim 5, wherein the threshold is 80 μL.

* * * * *